(12) United States Patent
Timuska et al.

(10) Patent No.: US 6,302,667 B1
(45) Date of Patent: Oct. 16, 2001

(54) OIL-FREE SCREW ROTOR APPARATUS

(75) Inventors: Karlis Timuska, Stockholm; Mats Sundström, Nacka, both of (SE)

(73) Assignee: Svenska Rotor Maskiner AB, Stockholm (SE)

( * ) Notice: Subject to any disclaimer, the term of this patent is extended or adjusted under 35 U.S.C. 154(b) by 0 days.

(21) Appl. No.: 09/485,588

(22) PCT Filed: Jun. 17, 1998

(86) PCT No.: PCT/SE98/01171

§ 371 Date: Feb. 11, 2000

§ 102(e) Date: Feb. 11, 2000

(87) PCT Pub. No.: WO99/13224

PCT Pub. Date: Mar. 18, 1999

(30) Foreign Application Priority Data

Aug. 25, 1997 (SE) .................................................... 9703054

(51) Int. Cl.$^7$ ...................................................... F01C 1/16
(52) U.S. Cl. .................... 418/201.1; 418/98; 418/152; 418/203; 418/DIG. 1; 184/6.16; 384/114; 384/322; 384/400
(58) Field of Search ..................... 418/98, 201.1, 418/152, DIG. 1, 203; 384/114, 322, 400; 184/6.16

(56) References Cited

U.S. PATENT DOCUMENTS

| | | | |
|---|---|---|---|
| Re. 32,055 | * 12/1985 | Schibbye et al. | 418/98 |
| 1,762,708 | * 6/1930 | Allred | 418/201.1 |
| 2,672,282 | * 3/1954 | Novas | 418/98 |
| 2,787,224 | * 4/1957 | Udale | 418/98 |
| 3,556,697 | * 1/1971 | Webb et al. | 418/98 |
| 3,656,823 | * 4/1972 | Tiraspolsky et al. | 308/160 |
| 3,975,123 | * 8/1976 | Schibbye | 418/201.1 |
| 4,394,113 | * 7/1983 | Bammert | 418/98 |
| 4,465,446 | * 8/1984 | Nemit, Jr. et al. | 418/201.1 |
| 4,553,915 | * 11/1985 | Eley | 418/102 |
| 4,558,960 | * 12/1985 | Lehtinen et al. | 384/373 |
| 4,637,787 | * 1/1987 | Segerstrom | 418/203 |
| 4,727,725 | * 3/1988 | Nagata et al. | 418/201.1 |
| 4,809,354 | * 2/1989 | Kawashima | 384/114 |
| 4,878,820 | * 11/1989 | Doi et al. | 418/203 |
| 5,167,496 | * 12/1992 | Jacobsson et al. | 418/201.1 |
| 5,211,267 | * 5/1993 | Clark | 188/576 |
| 5,513,917 | * 5/1996 | Ide et al. | 384/100 |
| 5,938,406 | * 8/1999 | Cerruti | 416/241 R |
| 5,957,676 | * 9/1999 | Peeters | 418/1 |
| 6,024,494 | * 2/2000 | Buse | 384/122 |
| 6,102,683 | * 8/2000 | Kirsten | 418/85 |

FOREIGN PATENT DOCUMENTS

| | | | |
|---|---|---|---|
| 3808912 | * 10/1989 | (DE) | 384/322 |
| 4200687 | * 7/1993 | (DE) | 384/400 |
| 0814267 A | 12/1997 | (EP) | . |
| 1486441 A | 9/1997 | (GB) | . |
| 56-009694 | * 1/1981 | (JP) | 418/98 |
| 04-307112 | * 10/1992 | (JP) | 384/322 |
| 06-129432 | * 5/1994 | (JP) | 384/400 |

* cited by examiner

Primary Examiner—Thomas Denion
Assistant Examiner—Theresa Trieu
(74) Attorney, Agent, or Firm—Frishauf, Holtz, Goodman, Langer & Chick, P.C.

(57) ABSTRACT

The invention relates to a rotary screw machine that is completely oil-free. Known rotary screw machines with cooling, sealing, lubrication of the screw rotors and oil-lubrication and oil-cooling of the bearings have been replaced with water-lubricated and water-cooled bearings.

Each screw rotor (102) is mounted in a water-lubricated radial slide bearing (1) and one trunnion (31) of the rotor co-acts with a water-lubricated thrust bearing (9, 10) which acts both as an hydrodynamic and an hydrostatic bearing. The trunnion bearing housing (21) is in fluid connection with the rotor housing, both along the trunnion and via a conduit (27) from the bearing housing interior to the gas inlet (108) of the screw rotor or via a channel which is cut-off from said inlet.

31 Claims, 5 Drawing Sheets

# OIL-FREE SCREW ROTOR APPARATUS

BACKGROUND OF THE INVENTION

The present invention relates to a screw rotor machine, and in particular to a screw rotor compressor.

Screw rotor machines are chiefly used as compressors for compressing gas, normally air, and to a lesser extent for expanding a compressed gas.

U.S. Pat. No. 3,975,123 teaches a screw compressor whose screw rotors are lubricated, cooled and sealed with water. The rotor trunnions are mounted on bearings that are lubricated with oil in a conventional manner.

The drawback with this construction is that axial seals between the oil-lubricated part and the oil-free part can burst or oil can leak to the oil-free part in some other way. An oil leakage of this nature will contaminate the gas with oil.

SUMMARY OF THE INVENTION

The object of the present invention is to provide a screw rotor machine in which the gas to be compressed or expanded will not be contaminated by oil from the bearing housings.

Another object is to provide a screw rotor machine whose bearings are lubricated and cooled without the use of oil and which is totally oil-free.

These objects are achieved with a screw rotor machine that has water-lubricated bearings and rotors. The bearing lubricant used is purely water that contains no additives, or water to which there has been added a freezing-point depressing agent, a viscosity-raising agent and/or a corrosion-inhibiting agent.

According to one preferred embodiment of the invention, the screw rotor machine includes a slide thrust bearing that acts both hydrodynamically and hydrostatically in one of each of the rotor bearing housings, wherein that part of the slide bearing located nearest the shaft is in fluid connection with a lubricant source via a radial slide bearing or plain bearing, while the opposite part of said thrust bearing is in connection with a working chamber or with the machine gas inlet.

BRIEF DESCRIPTION OF THE DRAWINGS

The present invention will be described hereinbelow with reference to an exemplifying embodiment thereof and also with reference to the accompanying drawings, in which.

DETAILED DESCRIPTION

Figure 1:
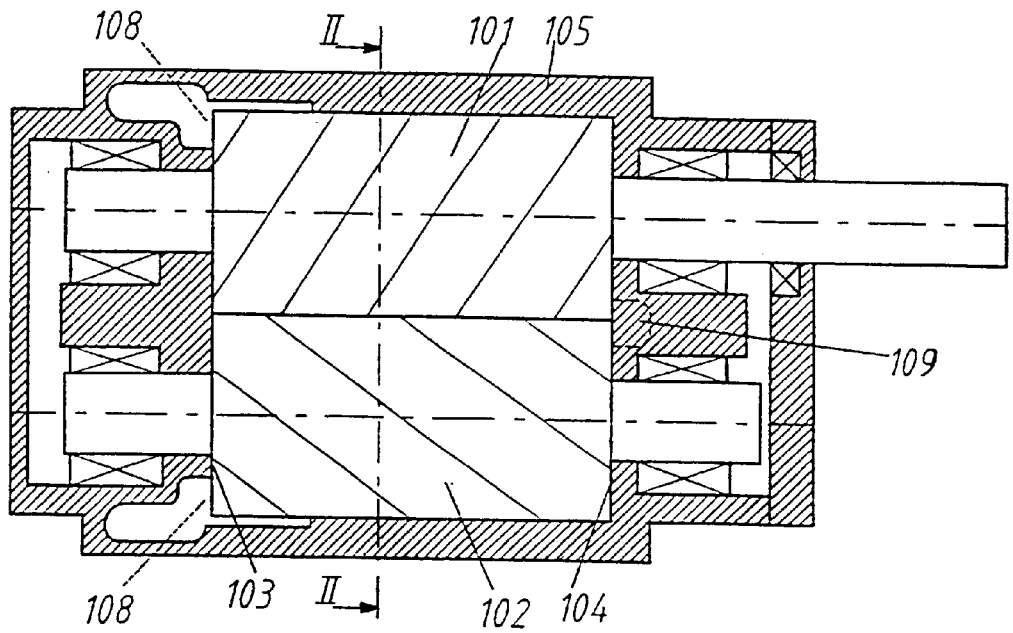
FIG. 1 is a longitudinal view of a known screw compressor.
Figure 2:
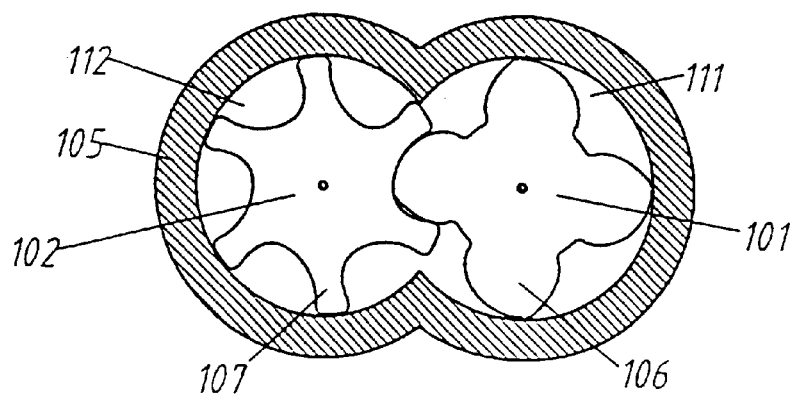
FIG. 2 is a sectional view taken on the line II—II in FIG. 1.

The constriction and working principle of a screw compressor will now be described briefly with reference to FIGS. 1 and 2.

A pair of mutually engaging screw rotors 101, 102 are rotatably mounted in a working chamber defined by two side-walls 103, 104 and a barrel wall 105 extending between said end-walls. The barrel wall 105 has a form which corresponds generally to the form of two mutually intersecting cylinders, as evident from FIG. 2. Each rotor 101, 102 includes a plurality of respective lobes 106, 107 and respective intermediate grooves 111, 112 which extend helically along the rotor. One rotor, 101, is a male type of rotor with which the major part of each lobe 106 is located outside the pitch circle, and the other rotor, 102, is a female type of rotor with which the major part of each lobe 107 is located inwardly of the pitch circle. The female rotor 102 will normally have more lobes than the male rotor 101. A typical combination is one in which the male rotor 101 has four lobes and the female rotor 102 has six lobes.

The gas to be compressed, normally air, is delivered to the working chamber of the compressor through an inlet port 108 and is then compressed in V-shaped working chambers defined between the rotors and the chamber walls. Each working chamber moves to the right in FIG. 1 as the rotors 101, 102 rotate. The volume of a working chamber thus decreases continuously during the latter part of its cycle, subsequent to communication with the inlet port 108 having been cut-off. The gas is thereby compressed and the compressed gas leaves the compressor through an outlet port 109. The ratio of the outlet pressure to the inlet pressure is determined by the built-in volumetric relationship between the volume of a working chamber immediately after its communication with the inlet port 108 has been cut-off and the volume of said working chamber when it begins to communicate with the outlet port 109.

A theoretic maximum displacement volume $V_{DP}$, such as $V_{DP}=(A_M+A_F) \times Z_M \times L$ is defined in respect of a screw compressor. This volume is expressed as the volume per male rotor rotation. $A_M$ and $A_F$ are the cross-sectional areas of respective male rotor grooves 111 and female rotor grooves 112, in cross-section to the rotor shafts. These cross-sectional areas $A_M$ and $A_F$ are hatched areas in FIG. 2. L is the rotor length and $Z_M$ the number of male rotor lobes.

An embodiment of the invention in the form of a compressor is described below with reference to FIGS. 3–6.

The description is concentrated mainly on a rotor bearing and rotor lubrication.

Figure 3:
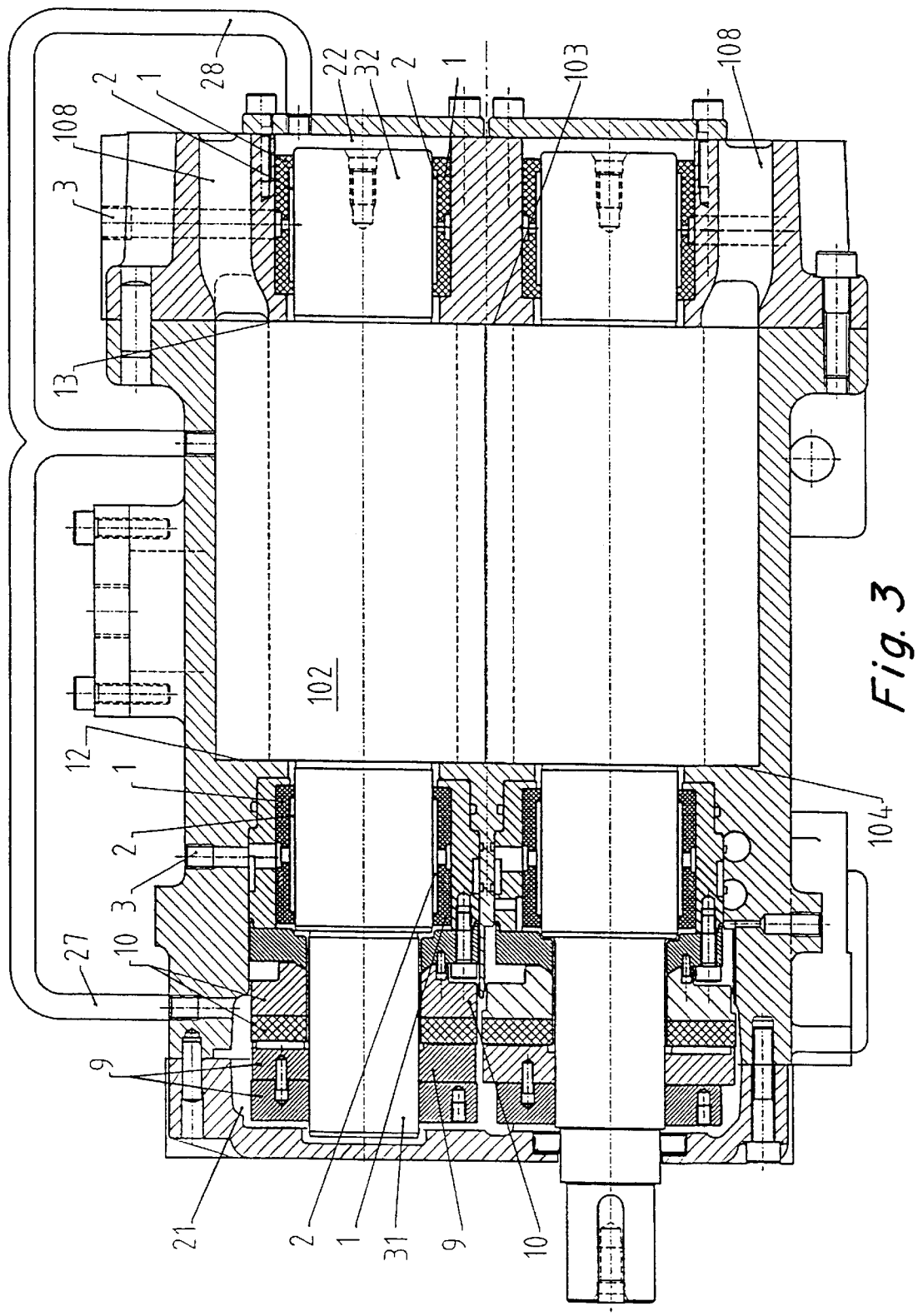
FIG. 3 is a sectional view of an inventive screw rotor machine.

The rotor 102 illustrated schematically in FIG. 3 is mounted in the rotor housing and its trunnions 31, 32 each project into a respective bearing housing 21, 22. The bearing housing 21 is located in the side-wall 104 while the other bearing housing 22 is located in the opposing side-wall or side-wall 103.

The actual rotor 102 is about 0.5 mm shorter than the distance at which the side-walls 103, 104 are spaced apart in the rotor housing. This feature has not been shown in FIG. 3. The rotor 102 can thus move axially.

Each of the trunnions 31, 32 of the rotor 102 is mounted in a respective radial slide bearing 1. The trunnion 31 is longer than the trunnion 32 and is provided with a thrust slide bearing 9, 10 that includes a part 9 which is fixedly mounted on the trunnion 31 and movable with said trunnion, and a stationary part 10 mounted in the bearing housing. That side of the trunnion-mounted annular bearing part which lies proximal to the rotor is at most 0.1 mm from the opposite other part 10 of the slide thrust bearing when the end-wall 13 of the rotor 102 connected with the trunnion 31 lies against the inner surface 12 of the side-wall 104. The rotor 102 can thus move axially through a distance of at most 0.1 mm from the end-wall 12 of the side-wall 104.

Each of the radial slide bearings 1 has the form of a sleeve-like element that includes at least one chamber 2, preferably two chambers 2, that is/are open to respective trunnions 31 and 32. When the radial slide bearing 1 includes two chambers 2, said chambers will preferably be disposed asymmetrically, although they may alternatively be disposed diametrically. Each chamber 2 is connected to a lubricant source (not shown) via a channel 3. The channel 3 extends from the chamber 2 radially through the sleeve-like slide bearing 1, and thereafter through respective side-walls 104 and 103 and from there (not shown) to the lubricant source. The lubricant is water or a water-based liquid. The water-based liquid may be an aqueous liquid which, in addition to water, may include a corrosion-inhibiting agent, a viscosity-raising agent, and/or a freezing-point depressing agent. Such agents are known and are available commercially. The water content will preferably be at least 60%.

The chamber 2 has the form of a groove extending in the center of the sleeve and terminating at a distance from the axial ends of the sleeve-like element 1. The slide bearing 1 thus has a circular cross-section at its axial ends and therewith a cylindrical abutment area against respective trunnions 31, 32.

According to one embodiment, the chamber 2 is connected with the space 7 by a channel 61 that extends through the end-wall 5.

The bearing housings 21, 22 are provided internally, i.e. in those parts that lie distal from the rotor 102, with a respective outlet port 27 and 28 for transporting water (lubricant) to either the compressor inlet or to a working chamber in said compressor that is delimited by the rotor housing and the two helical screw rotors 102, 101.

Figure 4:
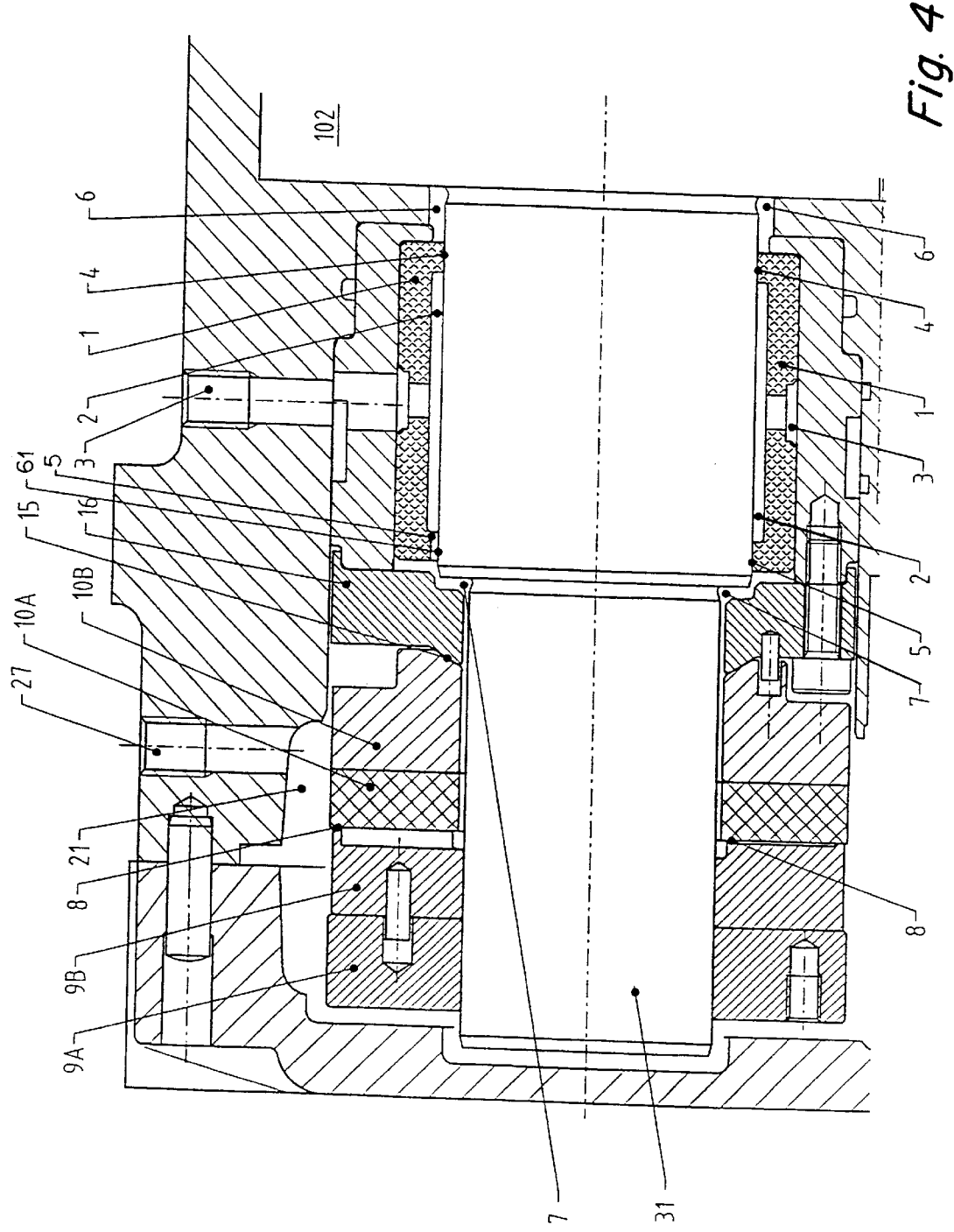
FIG. 4 illustrates part of the rotor machine shown in FIG. 3.

The slide thrust bearing 9, 10 will best be seen from FIG. 4. The part 10 includes a slide disc 10A against which the fixed part 9 on the shaft 31 abuts with a clearance that varies during operation of the compressor. The slide disc 10A is adjustably fastened in a stationary element 16 mounted in the bearing housing 21 via a support means 10B that has a spherical part-area 15, said element 16 having a part-area which is complementary to the part-area 15. A clearance 62 is provided between the trunnion 31 and the slide disc 10A, the support means 10B and the element 16.

The part 9 includes a ring 9A which is crimped onto the trunnion 31 or secured thereto in some other way. A bearing element 9B is fastened to the ring 9A. The bearing element 9B is located between the ring 9A and the slide disc 10A, with which it is in rotational abutment as the compressor works.

Figure 6:
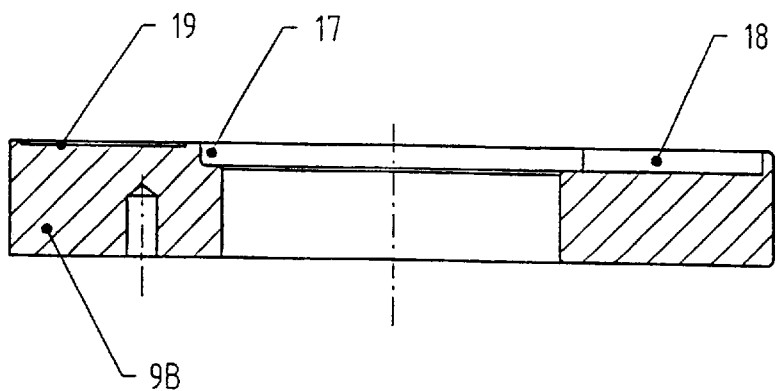
FIG. 6 is a sectional view of the bearing disc shown in FIG. 1, taken on the line VI—VI in said FIGURE.
Figure 5:
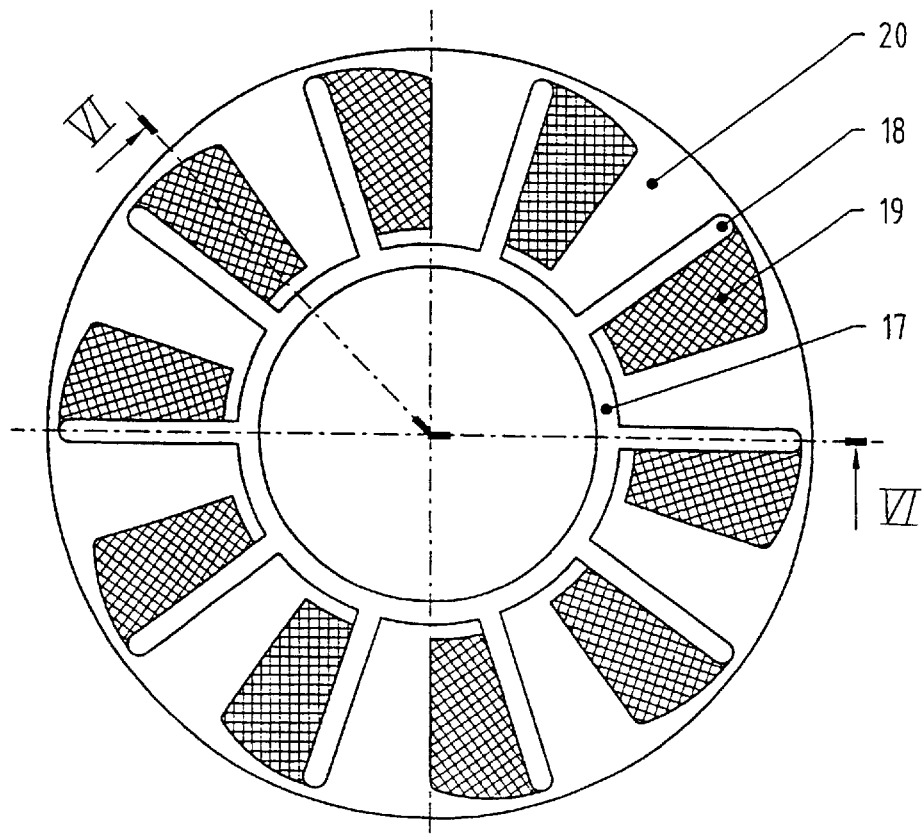
FIG. 5 illustrates a thrust bearing disc from above.

The bearing element 9B is shown in more detail in FIGS. 5 and 6. FIG. 5 shows the slide ring 9A from above, and FIG. 6 is a cross-sectional view taken on the line VI—VI in FIG. 5. The bearing element 9B has the form of an annulus or ring, where the inner diameter corresponds to the diameter of the shaft 31. The bearing element 9B forms together with the trunnion 31 a ring-shaped channel 17 which is open towards the slide ring. A plurality of channels 18 extend radially from the channel 17 towards the outer periphery of the bearing element, although terminating short of said periphery. These radial channels 18 are also open towards the slide disc 10A. Located adjacent each radial channel 18 is a recess area 19 which connects with the radial channel 18. The surface of the recess area 19 lies much closer to the surface 20 of the bearing element 9B that the bottom of the radial channels 18, as evident from FIG. 6. As will be evident from FIG. 5, the bearing element 9B has nearest the outer periphery a ring-shaped area intended for abutment with the slide disc 10A. Those parts of the bearing element 9B that are not comprised of channels 17, 18 or recessed areas 19 are also intended for abutment with the slide disc 10A.

The slide thrust bearing 9, 10 functions as a combined hydrostatic and hydrodynamic bearing.

When the compressor is working, lubricant, which is water, is delivered under pressure from the lubricant source through the channel 3 to the chamber 2 in which a pressure pl prevails. Those parts of the sleeve-like element 1 that do not include the chamber 2 that is open towards the trunnion 31 define a constriction that limits the flow of water from the chamber 2. These axial constrictions are referenced 4, 5 and preferably lie symmetrically outside the inlet opening of the channel 3 to the chamber 2. The bearing 1 works in accordance with the hydrodynamic principle.

A ring-shaped gap 6 is located to the right of the bearing 1, between the constriction 4 and the end-wall 12 of the rotor housing, as will be seen particularly from FIG. 4. A mean pressure pm prevails in the gap 6, said pressure lying between the compressor outlet pressure pd and the compressor inlet pressure p.

Water flows from the chamber 1 into the ring-shaped gap 6 through the clearance between the trunnion 31 and the constriction 4, and from said gap 6 to the working chamber of the compressor.

Located to the left of the bearing 1, between the constriction 5 of said bearing 1 and the bearing element 9B (FIG. 4), is a ring-shaped space 7, in which a pressure pi prevails, said pressure being lower than pl. The pressure pi is determined by the ratio of the gap areas at the constriction of the slide bearing 1 and at 8 between the bearing element 9B and the slide disc 10A. As a result of the described, particular embodiment of the bearing element surface that co-acts with the slide disc 10, the gap width will vary during operation of the compressor. The pressure pi is also influenced by the pressures pm and pk where pm is the pressure in the ring-shaped gap 6 and pk is the pressure in the bearing housing 21 outside the thrust bearing 9, 10.

Thus: pl>pi>pk

As earlier mentioned, the thrust bearing 9, 10 is a combined hydrodynamic and hydrostatic bearing. The hydrodynamic force component $F_{DYN}$ is generated by the recessed areas 19 in the rotating bearing element 9B; the hydrostatic component $F_{STAT}$ is generated by the ring-area of the bearing 9, 10 and the pressure difference (pi-pk).

The force $F_{AL}$ acting on the shaft 31, to the left in FIG. 4, is thus $$F_{AL}=F_{DYN}+F_{STAT}$$

The end surface 12 of the rotor 102 and the end surface 104 of the rotor housing also function as a counter-pressure bearing. When a state of equilibrium prevails, the trunnion 31 is acted upon by a force $F_{AE}$ which is equal to the force $F_{AL}$ but which acts in the opposite direction. When $F_{DYN}$ increases, the force $F_{AL}$ acting to the left in the drawing also increases. The rotor 102 is therewith drawn towards the end surface 12 of the rotor housing and the gap therebetween decreases and the pressure in the ring-shaped gap 6 rises. This pressure increase results in an increase in the force $F_{AL}$ that counteracts the force $F_{AE}$.

The pressure pk in the bearing housing 21 may be chosen to be equal to the working-chamber inlet pressure p or higher than this pressure. The pressure pk is selected by appropriate positioning of the means by which the bearing housing 21 is drained. When the inlet channel 108 is chosen as such means, pk will equal p, whereas pk will be greater than p if there is chosen a position in which the gas volume in the working space is cut-off from the inlet and compression has commenced.

Water or an aqueous liquid is delivered to the bearing 1 prior to starting-up the compressor. The areas in the thrust bearing 9, 10 are dimensioned so that $F_{AL}>F_{AE}$, and consequently the non-rotating rotors 101, 102 will be drawn towards the end surface 12 of the housing and occupy this position when the compressor is started-up.

When the compressor is activated and the rotors rotate, the gas forces generated in the working space of the compressor will act on the rotors in a direction opposite to the force $F_{AL}$ and therewith move the rotors 101, 102 away from the end surface 12. The distribution of the total clearance or play S=S1 (end surface clearance)+S2 (thrust bearing clearance) will be controlled by the gas forces or pd and by the applied water pressure pl and by the pressure pk in the bearing housing 21.

The pressure of the lubricant may fall markedly in the region outside the radial slide bearing 1 when the compressor is relieved of load, so as to result in insufficient lubrication of the slide thrust bearing. In order to obtain satisfactory lubrication, it is necessary to increase the pressure in the clearance 62. This can be achieved, for instance, by delivering lubricant to the clearance 62 via a radial channel passing through the element 16. Thus, supplied lubricant that penetrates into the gap-like space 7, past a constriction provided in the element 16 adjacent the gap-like space 7, is taken-out through a second channel that departs from the gap-like space 7.

The stationary part of the bearings is made of graphite or a polymeric material. The rotating part of said bearings is comprised of a hard, non-corrosive metal or a hard polymeric composite material.

At least one of the rotors is produced from a hard polymeric composite material, e.g. epoxy resin with $SiO_2$, the shaft or the trunnion is made of stainless steel, bronze or a metal that is coated with a corrosion-protective coating.

Water-cooled slide bearings, or plain bearings, enable the construction of a totally oil-free screw rotor machine. This obviates the need of shaft seals between an oil lubricant system and the oil-free part, and eliminates the risk of malfunctioning of the seals, often mechanical contact seals.

It has been found that the power consumption of a completely water-lubricated screw rotor machine is 5–10% lower than the power consumption of a corresponding screw rotor machine that includes oil-lubricated bearings and mechanical seals.

The cost of a screw rotor machine that includes water-lubricated bearings is also slightly lower than the cost of a corresponding machine that has oil-lubricated rolling bearings and requisite mechanical seals.

Figure 7:
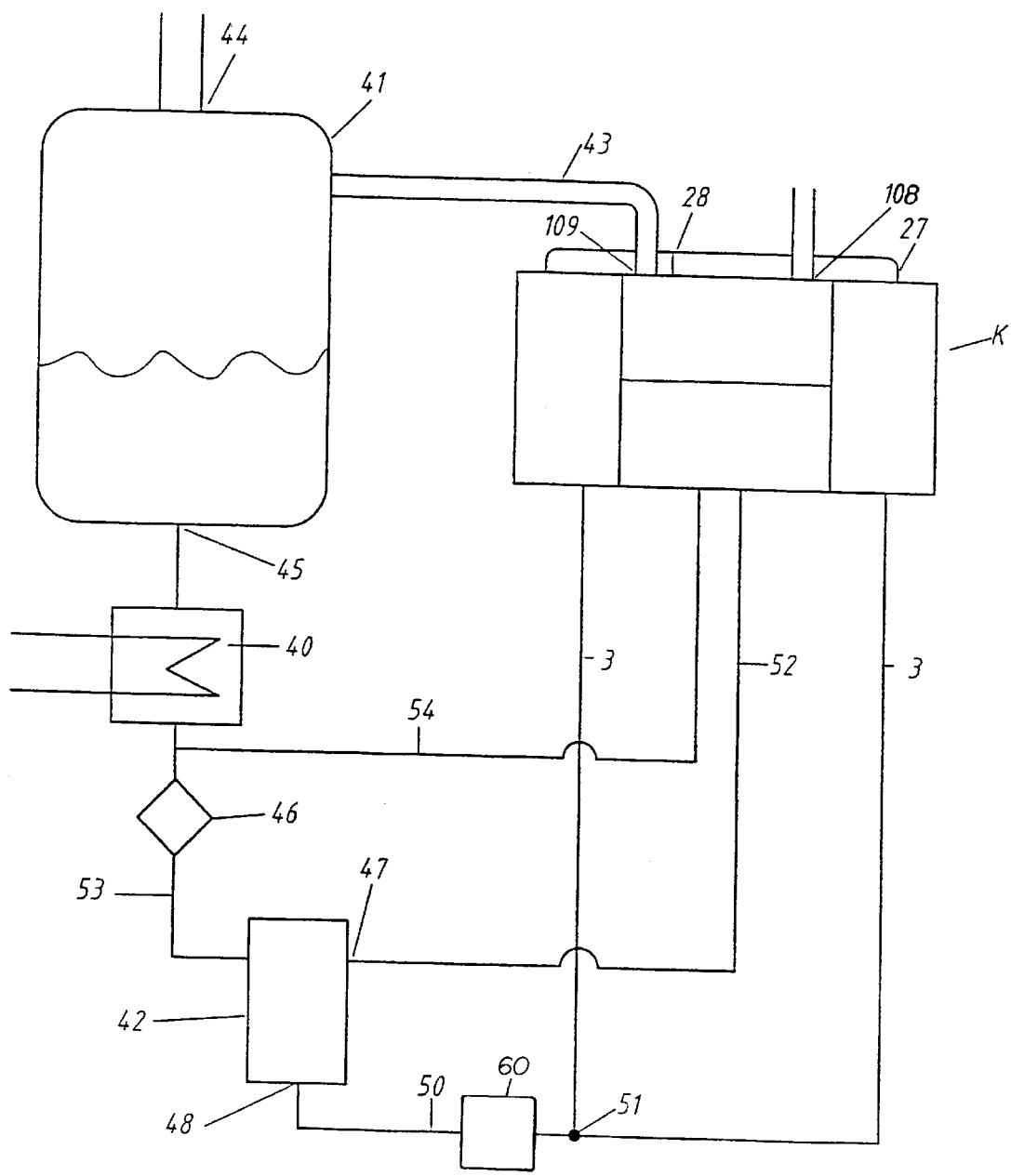
FIG. 7 is a schematic illustration of a system for returning water to the inventive compressor.

The water circulation system illustrated in FIG. 7 includes in series a compressor K, a first known air separator 41, a heat exchanger 40, and a second air separator 42. The first air separator is connected to the outlet port 109 of the compressor K by a conduit 43 and has two outlet ports 44, 45, a first outlet port 44 for compressed gas in its upper part and a second outlet port 45 in its lower part for separated water. The second outlet port 45 of the first air separator 41 is connected with the heat exchanger 40. The heat exchanger 40 is connected with the second air separator 42 by means of a conduit 53, which may include a filter 46.

The second air separator 42 also has two outlet ports 47, 48, a first outlet port 47 for gas-containing water and a second outlet port 48 for water that has only a low gas content and that can be used as a source of lubricant for the compressor K. A conduit 50 extending from the outlet port 48 branches-off at a branching point 51 into the conduits for lubricating the bearings of the compressor, these conduits being referenced 3 in FIG. 3. The water phase in the separator 42 is thus the lubricant source.

The gas-containing water leaving the separator 42 through its outlet port 47 is delivered to the working chamber of the compressor K through a conduit 52. A filter and/or an ion-exchanger may be provided between the second air separator 42 and the compressor K. The filter and/or ion-exchanger have not been shown in the Figure. The water passing through the heat exchanger 40 is cooled by water or air, for instance.

In order to minimize the size of the second separator 42, there is preferably provided a conduit 54 which connects the conduit 53 between the heat exchanger 40 and the second air separator 42 and the working chambers of the compressor K at the outlet end of said compressor. When the conduit 53 includes a filter, the conduit 54 departs from the conduit 53 between the heat exchanger 40 and the filter 46.

When the compressor K is working, air is introduced through the inlet port 108 and then compressed. The compressed air is delivered through the outlet port 109 and the conduit 43 to the first air separator 41, in which water is separated from the gas and collected at the bottom of the separator. The air from which water has been removed is taken out via the outlet port 44 in the upper part of the separator 41. Prior to delivering the water from the first air separator 41 to the second air separator 42, the water is cooled by heat-exchange, for instance a heat exchange with the surrounding atmosphere or with a liquid medium, such as water.

Most of the water cooled in the heat exchanger 40 passes directly to the working chambers of the compressor K through the conduit 54. The remainder of said water is delivered to the second air separator 42.

Air-containing water is taken from the second air separator 42 through the upper outlet port 47 and delivered to the closed working chambers of the compressor K (closed thread close to the inlet end of the compressor K. The water from which essentially all air has been removed in the second air separator 41 exits from the separator through the port 48 and the conduit 50. This water is used to lubricate the bearings of the compressor K in the aforedescribed manner.

A means for separating gas and cations 60 may be provided between the second air separator 42 and the conduit 3, as shown in FIG. 7.

What is claimed is:

1. A rotary screw machine comprising:
   mutually co-acting screw rotors having planar end surfaces that are perpendicular to respective axes of the rotors;
   trunnions that project out from said planar end surfaces;
   a rotor housing that houses said rotors, said rotor housing comprising a barrel wall and two mutually opposing parallel side-walls in which bearing housings for the trunnions are provided, wherein a distance between said side-walls is greater than a length of the rotors and the rotors are able to move axially between said side-walls;
   a radial slide bearing provided in each bearing housing in spaced relationship with the respective rotor end surfaces;
   a channel that connects a pressurized lubricant source with an area of each radial slide bearing that lies proximal to the trunnions, said channel supplying each radial slide bearing with lubricant during working of the machine; and a rotor-housing inlet and outlet for gas under a first pressure and a second pressure respectively;

wherein each radial slide bearing comprises a sleeve-like element that has at least one chamber which is open to the trunnions and which has axial limitations that define first and second constrictions on each side of said at least one chamber;

wherein said at least one chamber of the sleeve-like element which comprises each radial slide bearing is in fluid connection with the lubricant source; and wherein the lubricant is an aqueous liquid.

2. The rotary screw machine according to claim 1, wherein one axial limitation that defines the first constriction is located at a greater distance from the rotor housing than the second constriction and includes a through-passing channel that connects said at least one chamber of each sleeve-like element to outside of each radial slide bearing.

3. The rotary screw machine according to claim 2, wherein each sleeve-like element comprises two mutually spaced chambers and each chamber includes said through-passing channel.

4. The rotary screw machine according to claim 2, wherein each chamber is in fluid connection with a gap-like space at said second constriction, said space being defined by the respective side-walls and the respective rotor end-walls.

5. The rotary screw machine according to claim 4, wherein the bearing housing for each rotor includes a second fluid connection between the bearing housing and a channel formed in the rotor housing by the mutually co-acting rotors, and wherein each radial slide bearing is located between the rotor housing and an orifice of the second fluid connection in each bearing housing.

6. The rotary screw machine according to claims 4 to 5, wherein one of the trunnions has fixedly mounted thereon a disc whose side that lies proximal to the rotors abuts slidingly with a thrust bearing disc stationarily mounted in the bearing housing thereof, said thrust bearing disc being located between the disc and the radial slide bearing provided in the bearing housing of the trunnions.

7. The rotary screw machine according to claim 6, wherein an area of the disc in abutment with the thrust bearing disc includes at least one ring-shaped area at a periphery of the disc.

8. The rotary screw machine according to claim 7, wherein the disc includes radially extending grooves which are open towards the thrust bearing disc and one side-wall of which merges with a recessed area.

9. The rotary screw machine according to claim 8, wherein a ring-shaped area forms a seal against a peripheral part of the bearing housings which is in fluid connection with the rotor housing via a channel.

10. The rotary screw machine according to claim 9, wherein the end-surface of each of the rotors and a side-surface of the rotor housing function as a thrust bearing, and wherein the area of the disc in abutment with the thrust bearing disc is dimensioned so that the rotor will be moved towards said end-surface of the rotor when the chambers are pressurized and the rotors are stationary.

11. The rotary screw machine according to claim 10, wherein the rotors are held spaced from one of the side-walls by gas forces acting in the rotor housing during operation of the machine.

12. The rotary screw machine according to claim 7, wherein a ring-shaped area forms a seal against a peripheral part of the bearing housings which is in fluid connection with the rotor housing via a channel.

13. The rotary screw machine according to claim 12, wherein the end-surface of each of the rotors and a side-surface of the rotor housing function as a thrust bearing, and wherein the area of the disc in abutment with the thrust bearing disc is dimensioned so that the rotor will be moved towards said end-surface of the rotor when the chambers are pressurized and the rotors are stationary.

14. The rotary screw machine according to claim 13, wherein the rotors are held spaced from one of the side-walls by gas forces acting in the rotor housing during operation of the machine.

15. The rotary screw machine according to claim 1, wherein each sleeve-like element comprises two mutually spaced chambers.

16. The rotary screw machine according to claim 1, wherein each chamber is in fluid connection with a gap-like space at said second constriction, said space being defined by the respective side-walls and the respective rotor end-walls.

17. The rotary screw machine according to claim 16, wherein the bearing housing for each rotor includes a second fluid connection between the bearing housing and a channel formed in the rotor housing by the mutually co-acting rotors, and wherein each radial slide bearing is located between the rotor housing and an orifice of the second fluid connection in each bearing housing.

18. The rotary screw machine according to claim 1 or 2, wherein a channel is provided between at least one of the bearing housings and the rotor housing or the rotor housing inlet for the supply of the lubricant to the rotor housing.

19. The rotary screw machine according to claim 1 or 2, wherein at least one of the two bearing housings has an hydrodynamically and hydrostatically acting slide thrust bearing, and wherein a part of the slide thrust bearing located proximal to one of the trunnions is in fluid connection with the lubricant source via the radial slide bearings and an opposite part of the slide thrust bearing is in fluid connection with a working space in the machine or with the rotor housing inlet.

20. The rotary screw machine according to claim 1, wherein at least one rotor is comprised of a polymeric composite material.

21. The rotary screw machine according to claim 1, wherein in addition to water said water-based liquid contains at least one of a freezing-point depressing agent, a viscosity-raising agent, and a corrosion-inhibiting agent.

22. The rotary screw machine according to claim 1, wherein the water-based liquid is water that contains no additive.

23. The rotary screw machine according to claim 21 or 22, wherein the machine is a compressor.

24. The rotary screw machine according to claim 23, wherein the rotor housing outlet is connected to a water separator having an outlet for separated water and a gas outlet, and wherein the outlet for separated water is connected via a conduit to inlet openings into the rotor housing for lubricating and cooling the rotors.

25. The rotary screw machine according to claim 24, wherein the water separator includes a second outlet for separated water, said second outlet for separated water being connected to a second water separator having a second separated-water outlet which connects with said conduit and a second gas outlet, and wherein said second water separator is the lubricant source.

26. The rotary screw machine according to claim 25, further comprising means for separating gas and cations between the lubricant source and said conduit.

27. The rotary screw machine according to claim 26, wherein the second gas outlet is connected to the compressor via a return conduit.

28. The rotary screw machine according to claim 27, wherein the return conduit includes throttle comprising one of a constriction and capillary tube.

29. The rotary screw machine according to claim 24, further comprising means for separating gas and cations between the lubricant source and said conduit.

30. The rotary screw machine according to claim 29, wherein the second gas outlet is connected to the compressor via a return conduit.

31. The rotary screw machine according to claim 30, wherein the return conduit includes throttle comprising one of a constriction and capillary tube.

* * * * *